Figure 1:
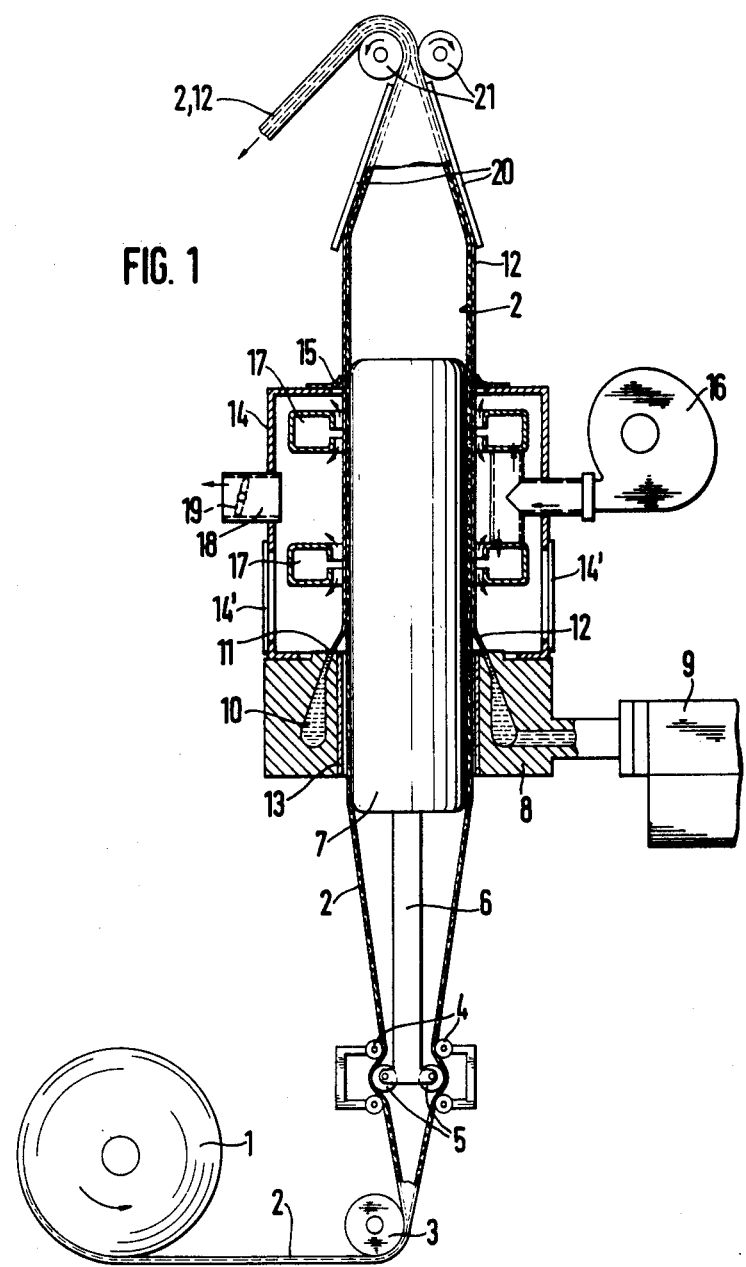

United States Patent [19]

Upmeier et al.

[11] 4,214,934

[45] Jul. 29, 1980

[54] PROCESS FOR COATING WOVEN TUBING OF FIBRILLATED TAPE WITH SYNTHETIC THERMOPLASTICS

[75] Inventors: Hartmut Upmeier, Lengerich of Westphalia; Horst Schmidt, Kattenvenne; Hans-Joachim Brauner, Bad Iburg, all of Fed. Rep. of Germany

[73] Assignee: Windmöller & Hölscher, Lengerich of Westphalia, Fed. Rep. of Germany

[21] Appl. No.: 928,560

[22] Filed: Jul. 27, 1978

Related U.S. Application Data

[63] Continuation of Ser. No. 772,130, Feb. 25, 1977, abandoned.

[30] Foreign Application Priority Data

Mar. 11, 1976 [DE] Fed. Rep. of Germany ...... 2608455

[51] Int. Cl.² ............................................. B29D 23/05
[52] U.S. Cl. ...................... 156/244.11; 156/244.12; 156/244.13; 156/244.21; 156/244.26; 156/244.27; 264/209; 264/514; 264/515; 264/516; 264/563; 264/565; 264/566; 264/569; 425/113; 425/393; 425/403
[58] Field of Search ............. 156/149, 244.12, 244.13, 156/244.14, 244.24, 244.26, 244.27, 497, 498, 500; 264/94, 95, 96, 98, 99, 173, 209; 425/113, 114, 133.1, 384, 393, 403

[56] References Cited

U.S. PATENT DOCUMENTS

| | | | |
|---|---|---|---|
| 2,874,411 | 2/1959 | Berquist | 425/114 |
| 2,990,577 | 7/1961 | De Laubarede | 425/114 |
| 3,159,877 | 12/1964 | Orsini | 425/113 |
| 3,370,999 | 2/1968 | Schwarzrock | 156/244.11 |
| 3,579,623 | 5/1971 | Thomson et al. | 264/209 |
| 3,905,853 | 9/1975 | Stent | 156/244.11 |

Primary Examiner—Caleb Weston
Attorney, Agent, or Firm—Fleit & Jacobson

[57] ABSTRACT

The woven tubing is continuously advanced and is opened and backed from the inside in a certain region, in which plastics material tubing which is larger in diameter than the woven tubing is extruded and oriented around and is forced in a soft condition against the woven tubing and then cooled.

4 Claims, 3 Drawing Figures

PROCESS FOR COATING WOVEN TUBING OF FIBRILLATED TAPE WITH SYNTHETIC THERMOPLASTICS

This is a continuation of application Ser. No. 772,130 filed Feb. 25, 1977, abandoned.

This invention relates to a process of coating woven thermoplastic tubing of fibrillated tape with synthetic thermoplastic material and apparatus for carrying out the process.

Self-supporting valved bags and flat bags are often made from non-oriented single-ply thermoplastic tubing, which is usually extruded in tubular form or is made in that flat extruded sheeting is folded and then welded or adhesively joined to form a tubing. Such single-ply tubing of synthetic thermoplastics has only a relatively low strength and in some cases is unstable when used at very high or very low temperatures. The disadvantages which reside in a low strength and inadequate thermal stability are avoided by the use of woven webs which consist of oriented fibrillated tapes of plastics material and are usually rendered impermeable to moisture and dust by an extruded coating. For reasons of weaving technology it was possible so far only to make a flat woven fabric from fibrillated tape.

That flat woven fabric was coated on one side with a thermoplastic film in the roller frame of an extrusion coating plant and was then welded at its two longitudinal edges to form a tubing. The longitudinal seam of the resulting weld has in no case the strength of the woven fabric of fibrillated tape and can easily be torn, particularly under shock load.

As a result of further developments in weaving technology, it is now possible to produce at a high production rate a woven tubing which consists of fibrillated tape and has no longitudinal seams and exhibits the same strength in all regions. On the other hand, problems arise in the coating of such woven tubing of fibrillated tape with synthetic thermoplastics in order to render the woven tubing impermeable to dust and moisture. At the present time, the tubing is coated in a conventional extrusion coating plant, in which the flattened woven tubing is first coated on one side and in a second pass through the extrusion coating plant is coated on the other side. Because the flattened tubing cannot be coated exactly as far as to its edges, fins of coating material protrude from the edges. In the manufacture of boxlike bags or large bags having an approximately square bottom from length sections of the coated woven tubing, these protruding fins render the formation of tight ends more difficult because it is hardly possible to avoid a formation of passages through which moisture can enter or solids filled into the bags can trickle out.

For this reason it is an object of the invention to provide a process and apparatus by which woven tubing of fibrillated tape can be coated with a plastics material film of uniform thickness so that the tubing has the same strength at all points of its periphery and the coated woven tubing can be processed further without difficulty.

In a process of the type mentioned first hereinbefore this object is accomplished according to the invention in that the woven tubing is continuously advanced and is opened and backed from the inside in a certain region, in which plastics material tubing which is larger in diameter than the woven tubing is extruded and oriented around the woven tubing and is forced in a soft condition against the woven tubing and then cooled. The tube which is used to coat the woven tubing is first extruded in a considerable thickness and is then oriented so that it is attenuated and approaches the woven tubing until the extruded tubing is forced against the woven tubing and adhesively bonded thereto because the extruded tubing is in a soft condition. Because the extruded tubing contacts the woven tubing only after the extruded tubing has travelled along a certain distance and has been oriented to a certain extent, part of the heat of the extruded tubing has already been dissipated before it contacts the woven tubing so that the extruded tubing cannot melt the woven tubing but is only adhesively bonded to the latter.

German Utility Model Specification No. 1,928,736 discloses a plant for manufacturing internally reinforced thermoplastic tubing in that a first inner tubing is extruded and is then provided with a braided covering of reinforcing threads by rotary braiders and is subsequently coated on the outside with a tubular film, which is directly applied to the braided reinforcing covering from a die orifice which has an exit diameter that corresponds to the diameter of the tubing to be coated. A tubular film cannot be applied to a synthetic thermoplastic woven tubing of fibrillated tape in the known manner because the extruder head temperature and melt temperature are so high that the tubular film would destroy the woven tubing of fibrillated tape.

Printed German patent application No. 2,137,059 discloses apparatus for manufacturing plastics material tubing which comprises a woven tubular reinforcing insert. In the known apparatus an internal mandrel is held by a retaining roller system in the woven reinforcing tubing, which is surrounded by an extruder head, in which the thermoplastic material for forming the coating is extruded onto the inside and outside of the woven tubing so that the extruded material entirely penetrates the reinforcing woven tubing. That known apparatus also cannot be used to coat thermoplastic woven tubing of fibrillated tape because the latter would be melted during the coating operation.

The process according to the invention can be carried out by apparatus which comprises a tubular die that is supplied with synthetic thermoplastic material from an extruder and surrounds a mandrel for opening the woven tubing, and means for feeding the woven tubing and for withdrawing the coated tubing and which is characterized in accordance with the invention in that the orifice of the tubular die is larger in diameter than the opened woven tubing, that the tubular die is succeeded by a superatmospheric pressure chamber, which has a wall that defines an annular clearance and surrounds the extruded tubing adjacent to the mandrel and is sealed by a sealing lip against the tubing which leaves that annular clearance, that the superatmospheric pressure chamber contains cooling air supply rings, which have outlet slots that are directed to the extruded tubing intended to form the coating, and that the superatmospheric pressure chamber is provided with an inlet pipe and with a cooling air outlet pipe, which contains a hinged throttle valve. In the apparatus according to the invention, the woven tubing of fibrillated tape is reopened into tubular form on the inner mandrel, which consists of an opening mandrel. A completely formed tubular coating film emerges from the tubular die, which surrounds the woven tubing of fibrillated tape and which has an orifice that is much larger in diameter than the woven tubing. Only after a travel over a certain distance is that tubular coating film forced in a still soft state against the woven tubing of fibrillated tape by the controlled pressure in the superatmospheric pressure chamber. Because the thickness of the coating film as its emerges from the die orifice greatly exceeds the thickness of the subsequently formed coating, the thick-walled portion of the extruded tubing resists the pressure in the superatmospheric pressure chamber. As the extruded tubing is attenuated to the thickness of the final coating, its resistance decreases to such an extent that when the extruded tubing has been attenuated to the thickness of the coating the extruded tubing is forced in a still softened state against the woven tubing of fibrillated tape.

The coating film which contacts the woven tubing is cooled in the superatmospheric pressure chamber by means of cooling rings so that this chamber can be sealed against the coated woven tubing of fibrillated tape by means of a resilient lip. The superatmospheric pressure in the chamber can be controlled within a wide range by a control of the flow of cooling air out of the chamber.

Further desirable features of the invention are described in the sub-claims.

Figure 2:
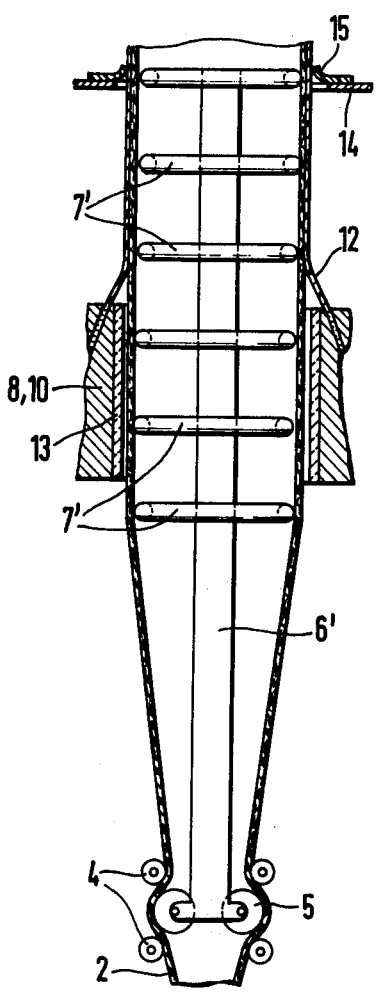
Figure 3:
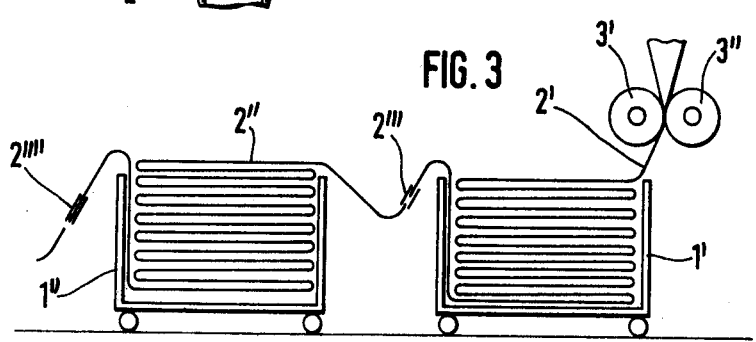

An illustrative embodiment of the invention will be explained more fully hereinafter with reference to the drawing, in which FIG. 1 is a diagrammatic longitudinal sectional view showing a coating apparatus, FIG. 2 shows partly in longitudinal section an apparatus as shown in FIG. 1, which comprises a backing mandrel composed of rings, and FIG. 3 shows how the flattened woven tubing can be stored in a zig-zag configuration in containers.

In the apparatus shown in FIG. 1, a flattened woven tubing 2 of fibrillated tape is unwound from a supply roll 1, which is mounted in an unwinder in a manner which is not shown. The woven tubing 2 is then trained around a deflecting roller 3 and fed to an opening mandrel 7, which is held on the illustrated level relative to the coating die and the superatmospheric pressure chamber by a retaining roller system 4, 5 and a holding beam 6. The rollers 5 mounted on the beam 6 bear on the outer rollers 4, which are mounted in the frame at fixed position. In the embodiment shown by way of example in FIG. 1, the opening mandrel 7 consists substantially of a cylindrical member.

The woven tubing of fibrillated tape which is expanded by the opening mandrel 7 is surrounded by a tubular die 8, which defines a diagrammatically indicated annular distributing chamber 10 for receiving coating material from an extruder 9 and for feeding the coating material through a die orifice 11 so that the coating material forms a film 12. When this film has travelled over a certain distance and has been cooled but is still soft, the film is contacted with the woven tubing of fibrillated tape by the superatmospheric pressure. Heat insulation 13 provided in the tubular die 8 prevents an excessive heating of the oriented woven tubing of fibrillated tape. The wall of a superatmospheric pressure chamber 14 is air-tightly secured to the top of the tubular die 8 and is provided with removable covers 14' over access openings and with resilient lips 15 for sealing the superatmospheric pressure chamber against the coated woven tubing. Cooling air is delivered by a cooling air blower 16 and is directed in the superatmospheric pressure chamber 14 onto the coating by cooling rings 17. The distance from the first air cooling ring 17 behind the coating die 8 to said die is suitably adjustable so that the coating film can be cooled almost to its solidification point before its initial contact with the woven tubing of fibrillated tape, when this is desired. By means of a hinged throttle valve 19 in an outlet pipe 18, the superatmospheric pressure in the chamber 14 is controlled in dependence on the rate at which cooling air is delivered by the blower 16 so that the cooling action and the pressure under which the coating is applied can be varied within wide limits.

When the coating 12 adheres to the woven tubing 2 of fibrillated tape, the latter tubing is flattened by means of flattening plates 20, withdrawn by a pair of stripper rolls 21 and then fed to a winder, which is not shown.

FIG. 2 shows another embodiment of an opening mandrel 7, which consists of several backing rings 7', which are mounted on a holder 6' and axially spaced suitable distances apart.

To enable an adaptation to variations in width of the woven tubing of fribrillated tape without a formation of wrinkles, the opening mandrel 7 or the backing rings 7' are suitably resiliently yieldable in the radial direction to a certain extent. The resulting clearance at the periphery of the opening mandrel does not disturb the backing of the woven tubing of fibrillated tape.

To apply a controlled tension to the woven tubing which consists of fibrillated tape and is to be coated, it is desirable to provide the retaining rollers 4 with a snubber and to provide the peripheral surface of said rollers with a high-friction rubber covering.

Because it is fairly complicated to thread the woven tubing of fibrillated tape through the coating die and the superatmospheric pressure chamber when said tubing is to be coated, the supply roll 1 may be replaced by containers 1', 1'', in which the flattened woven tubing 2', 2'' of fibrillated tape which is to be coated is laid in a zigzag configuration. When the woven tubing of fibrillated tape is held ready in this manner, successive lengths 2', 2'', etc. of the woven tubing of fibrillated tape can be joined without difficulty by adjesive bonds 2''' and 2'''' at the periphery of the tubing so that these peripheral bonds can pass through the coating apparatus without difficulty.

As soon as the first container has been emptied, the next following filled container is pushed into the same position and the woven tubing stored in a further container is adhesively joined to the preceding length of tubing.

What is claimed is:

1. A process for coating woven thermoplastic tubing of fibrillated tape with synthetic thermoplastic material, comprising continuously advancing and opening woven tubing; providing backing for the open tubing from the inside; forming a superatmospheric pressure chamber surrounding the opened tubing; extruding, orienting and cooling plastics material tubing within the superatmospheric pressure chamber, the plastics material tubing, when extruded, surrounding the woven tubing and having a larger diameter than the woven tubing; forcing the extruded, oriented and cooled plastics material tubing in a soft condition against the woven tubing; and cooling the combined woven tubing and plastics material.

2. A process according to claim 1, characterized in that the forcing of the extruded and oriented tubing in a soft state against the woven tubing is accomplished by the action of compressed air.

3. A process according to claim 1 wherein cooling rings are positioned in the superatmospheric pressure chamber and wherein cooling air is passed through said cooling rings directly onto the combined woven tubing and plastics material thereby cooling the combined material, the air directed onto the combined material thereafter forming the superatmospheric pressure chamber.

4. A process for coating woven thermoplastic tubing of fibrillated tape with synthetic thermoplastic material, comprising:

continuously advancing and opening woven tubing;

forming a superatmospheric pressure chamber surrounding the opened tubing;

extruding, orienting and cooling plastic material tubing within the pressure chamber, the extruded tubing surrounding and having a larger diameter than the woven tubing;

forcing the extruded tubing in a soft condition against the woven tubing; and directing cooling air directly onto the combined woven and extruded tubing from a plurality of axially spaced cooling rings surrounding the tubing, the cooling air, after contacting the tubing, being used to form the superatmospheric pressure chamber.

* * * * *